United States Patent
Kong

(10) Patent No.: US 7,147,192 B2
(45) Date of Patent: Dec. 12, 2006

(54) CUP ADAPTER INSERTED IN AUTOMOBILE'S CUP HOLDER

(75) Inventor: Byung Seok Kong, Ulsan Metropolitan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/262,206

(22) Filed: Oct. 28, 2005

(65) Prior Publication Data

US 2006/0118688 A1   Jun. 8, 2006

(30) Foreign Application Priority Data

Oct. 28, 2004   (KR) ..................... 10-2004-0086701

(51) Int. Cl.
*A47K 1/08* (2006.01)

(52) U.S. Cl. ..................... 248/311.2; 248/313; 224/926

(58) Field of Classification Search ............. 248/311.2, 248/313; 224/926
See application file for complete search history.

(56) References Cited

U.S. PATENT DOCUMENTS

| | | | |
|---|---|---|---|
| 3,664,617 A | * | 5/1972 | Fenwick ..................... 248/539 |
| 4,469,302 A | * | 9/1984 | Stoudt ........................ 248/512 |
| 5,174,534 A | * | 12/1992 | Mitchell .................. 248/311.2 |
| 5,655,742 A | * | 8/1997 | Whitman et al. ........ 248/311.2 |
| 6,189,755 B1 | * | 2/2001 | Wakefield ................... 244/542 |

* cited by examiner

*Primary Examiner*—Korie Chan
(74) *Attorney, Agent, or Firm*—Morgan Lewis & Bockius LLP

(57) ABSTRACT

A cup adapter inserted in a cup holder of an automobile to increase cup retaining force. The cup adapter comprises a bottom wall adapted to be in close contact with a bottom surface of the cup holder; and a cylindrical side wall having plural convex guide portions, wherein the plural convex guide portions are inwardly projected and each have a concave recess in the external sides thereof, and plural frictional projections are formed in the concave recess, the frictional projections being horizontally projected.

4 Claims, 3 Drawing Sheets

CUP ADAPTER INSERTED IN AUTOMOBILE'S CUP HOLDER

CROSS-REFERENCE TO RELATED APPLICATION

This application claims priority to and the benefit of Korean Patent Application 10-2004-0086701 filed in the Korean Intellectual Property Office on Oct. 28, 2004, the entire content of which is incorporated herein by reference.

BACKGROUND OF THE INVENTION

1. Field of the Invention

The present invention relates to a cup adapter for insertion in an automobile cup holder, and more particularly to a cup adapter that improves cup securing force.

2. Description of the Related Art

As generally known in the art, when a smaller size cup is inserted in a large size cup receiving holder, in order to improve a cup securing force, a cup adapter formed separately from the cup holder is inserted in the cup holder so that the cup adapter supports the side wall of the small size cup to prevent the play of the small size cup.

However, a user frequently separates the cup from the cup holder to use the cup as desired. In this regard, there can be a problem in that when the cup adapter is separated, there can be substantial deterioration in external appearance. Also, foreign matters such as dust may flow into the inner side of the cup adapter through holes therein, which causes dissatisfaction of consumers.

SUMMARY OF THE INVENTION

Embodiments of the present invention provide a cup adapter for an automobile's cup holder, which is not only allowed to be securely fixed to the cup holder without any separate clamping hook at the bottom wall thereof but also eliminates a problem in external appearance which may be caused by the cup holder, and in which foreign matters such as dusts are prevented from getting into and being deposited on the interior of the cup adapter.

In an exemplary embodiment of the invention a cup adapter, comprises a bottom wall adapted to be in close contact with a bottom surface of the cup holder and a cylindrical side wall having plural convex guide portions. The plural convex guide portions are inwardly projected and each have a concave recess in the external sides thereof. Plural frictional projections are formed in the concave recess with, the frictional projections being horizontally projected.

According to one embodiment of the present invention, the cup adapter may be formed from an elastic material and fabricated by using a forcible extraction mold. The convex guide portions also may have a circular cross-section.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
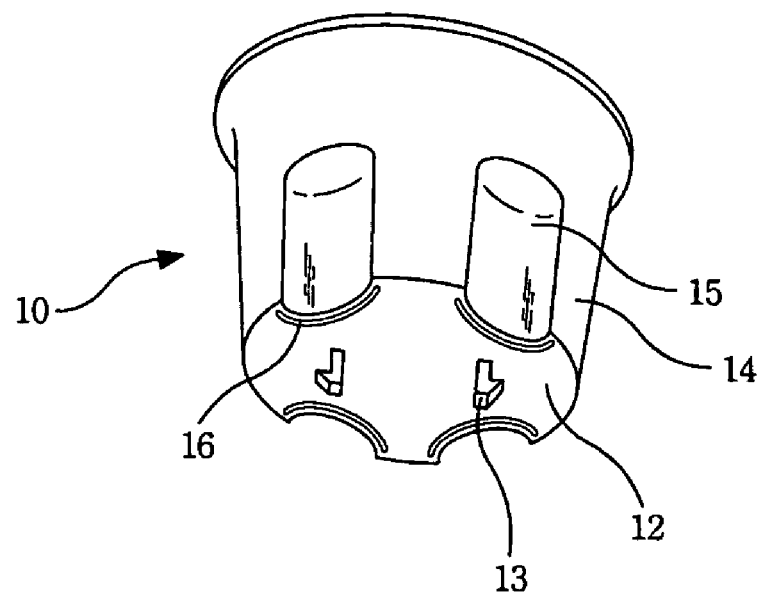
FIG. 1 is a perspective view illustrating a cup adapter according to an embodiment of the present invention.
Figure 2:
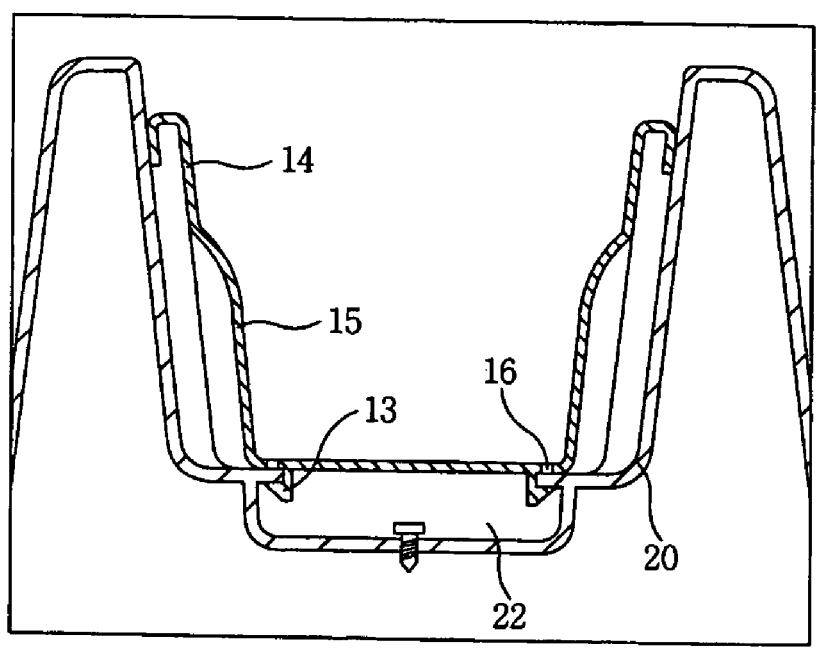
FIG. 2 is a cross-sectional view illustrating an embodiment, of a cup adapter fitted in a cup holder according to the invention.

Hereinafter, an exemplary embodiment of the present invention will be described with reference to the accompanying drawings. In the following description and drawings, the same reference numerals are used to designate the same or similar components, and so repetition of the description on the same or similar components will be omitted.

As shown in the drawings, a cup adapter 100 comprises a bottom wall 120 to be in close contact with a cup holder and a cylindrical side wall 140, which define a cup receiving space. The bottom wall 120 is formed in a flat form without any clamping hook or other protrusion. By providing a mat member 25 between the bottom wall of the cup holder 20 and the bottom wall 120 of the cup adapter, it is possible to prevent a recess 22 located at the central part of the cup holder from being exposed even if the cup adapter 100 is removed.

Cup adapter 100 has convex guide portions 150 projectedly formed on the side wall thereof independently from the bottom wall. Convex guide portions 150 are distributed along the central part in the height of the side wall and the external sides of the convex guide portions 150, i.e., the sides facing to the cup holder 20, are formed with plural frictional projections 152.

If a cup C is inserted into the cup adapter 100, the convex guide portions 150 are deformed outwardly of the cup adapter 100 while retaining the side wall of the cup, and the frictional projections 152 come into close contact with the inner side of the cup holder 20, thereby increasing the frictional force between the cup adapter 100 and the cup holder 20 and preventing the cap adapter 100 from being extracted by the frictional force when the cup C is drawn out.

Figure 3:
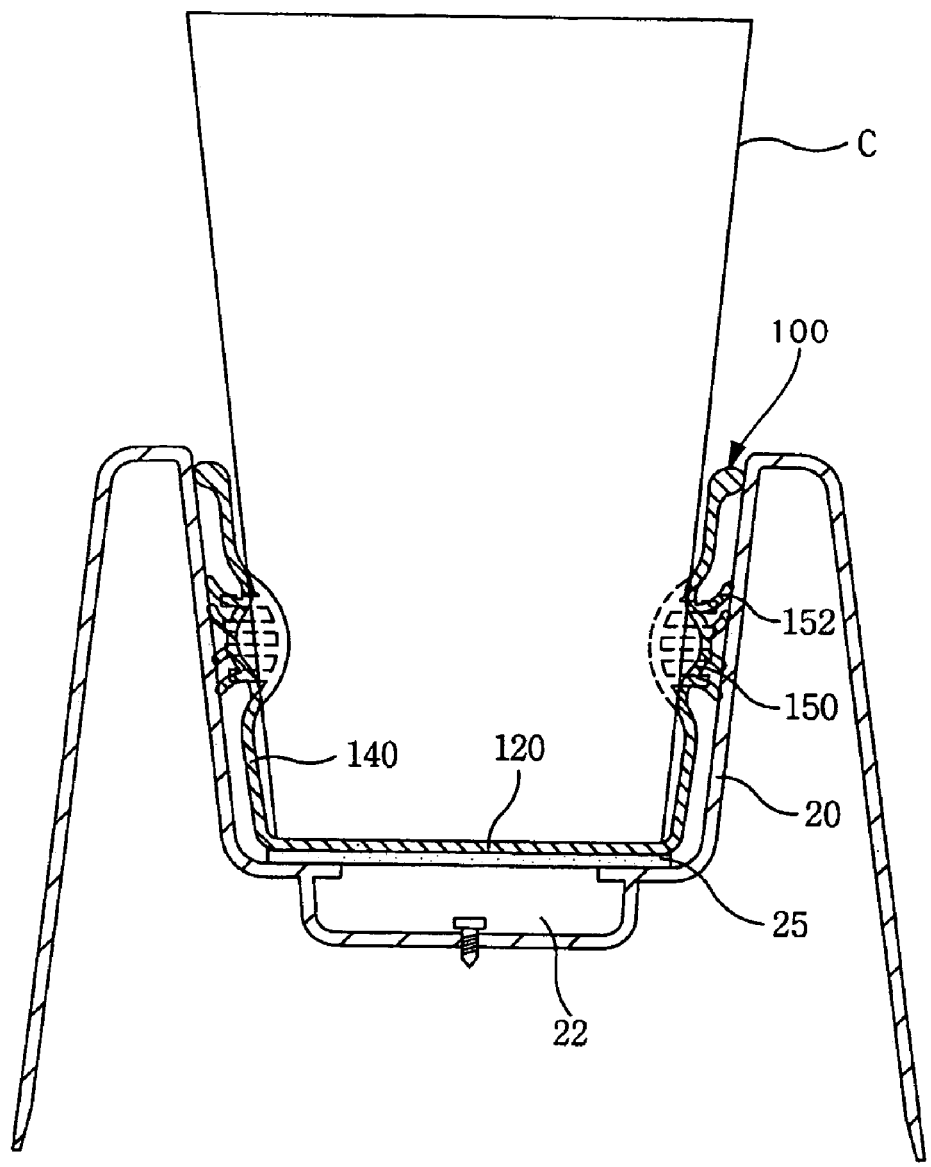
FIG. 3 is a cross-sectional view illustrating an embodiment, in which a cup is fixed in cup adapter fitted in the cup holder according to the invention.

FIG. 3 is a cross-sectional view illustrating an embodiment of the present invention, in which the cup C is fixed in the inventive cup adapter 100 fitted in the cup holder 20. As shown in the drawing, when the cup C is placed in the inventive cup adapter 100, the outer circumferential surface of the cup C is supported by the surfaces of the convex guide portions 150 of the cup adapter 100, thereby being stably gripped.

In this state, because the frictional projections formed outside of the convex guide portions formed to project toward the cup holder 20 are compressed and contacted against the side wall of the cup holder 20, the frictional force between the cup adapter and the cup holder 20 is increased over the frictional force between the cup C and the cup adapter 100.

As a result, the conventional clamping hooks on the bottom of the adapter as sometimes clamping the cup adapter used in the prior art are not required. The bottom wall 120 of the cup adapter 100 can be flatly formed, and the mat member 25 can be additionally provided, thereby improving the external appearance when the cup adapter 100 is removed.

Figure 4:
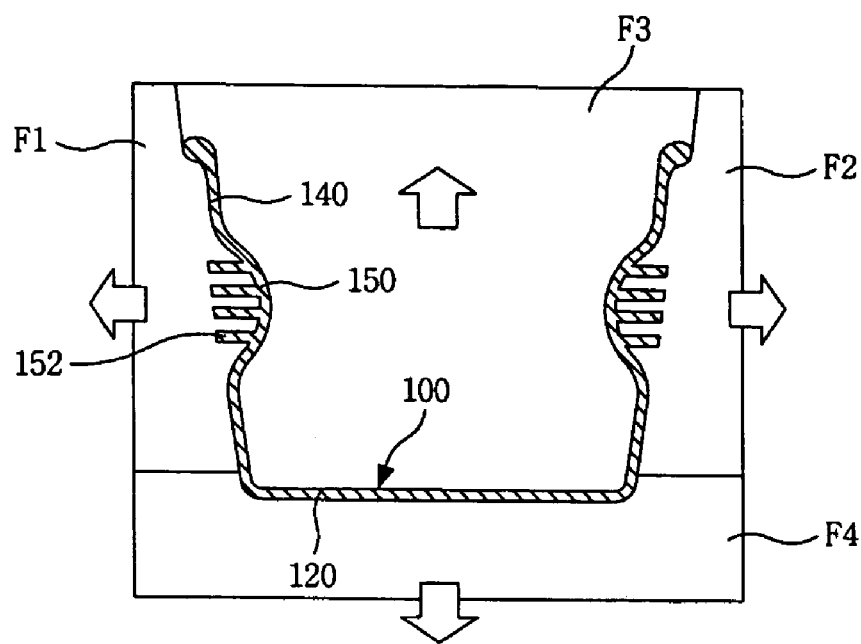
FIG. 4 is a cross-sectional view illustrating a construction of a mold for forming a cup adapter according to the embodiment of the invention.

FIG. 4 is a cross-sectional view illustrating a construction of a mold for molding the inventive cup adapter 100. Because the inventive cup adapter 100 is formed from an elastic material, it is possible to employ a forcible extraction molding process. Plural mold units F1, F2, F3, F4 are combined to shape cup adapter 100. Lateral mold units F1, F2 are firstly removed, then the internal core mold unit F3 is forcibly extracted. Then the bottom mold unit F4 is removed, as shown in the drawing, in order to form the convex guide portions 150 to be projectedly formed in a circular cross-section around the central part in the height of the side wall 140.

Such a forcible extraction molding process is a molding process for use in molding a high-strain material. By way of example only, a cup adapter according to the present invention may be formed from an STE 2050 material having a physical property of a strain of about 300% and a flexural elasticity of about 2,500 kg/cm$^2$, for example.

If the forcible extraction molding process is employed as described above, it is possible to form convex guide portions 150 on the side wall independently from the bottom wall without forming the convex guide portions on the bottom wall as in the prior art. In addition, by upwardly displacing the height of the convex guide portions 150 to upwardly displacing the cup C retaining points, it is possible to improve the cup retaining force.

As described above, a inventive cup adapter according to embodiments of the invention does not require a separate clamping arrangement because the projections formed in the convex guide portions serve to clamp the cup adapter in the cup holder. Therefore, there is an effect of retaining a neat and tidy appearance.

In addition, because the convex guides can be formed on the side wall of the cup adapter independently from the bottom, it is possible to upwardly displace the cup retaining points, thereby increasing the cup retaining force.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A cup adapter inserted in an automobile's cup holder to increase a cup retaining force, comprising:
   a bottom wall adapted to be in close contact with a bottom surface of the cup holder; and
   a curved side wall having plural convex guide portions, wherein the plural convex guide portions are inwardly projected and each has a concave recess in the external sides thereof and plural frictional projections formed in the concave recess, the frictional projections being horizontally projected.

2. A cup adapter as claimed in claim 1, wherein the cup adapter is formed from an elastic material by using a forcible extraction mold.

3. A cup adapter as claimed in claim 1, wherein the convex guide portions have a circular cross-section.

4. A cup adapter as claimed in claim 1, wherein a mat member is interposed between the bottom wall of the cup holder and the bottom wall of the cup adapter.

* * * * *